US011478884B2

(12) United States Patent
Tian et al.

(10) Patent No.: US 11,478,884 B2
(45) Date of Patent: Oct. 25, 2022

(54) FULL-AUTOMATIC STORAGE SHELF ASSEMBLY PRODUCTION LINE AND OPERATION METHOD THEREOF

(71) Applicants: JIANGSU JINLING INSTITUTE OF INTELLIGENT MANUFACTURING CO., LTD., Jiangsu (CN); UNITED MATERIAL HANDLING INC, Moreno Valley, CA (US)

(72) Inventors: Xiaohe Tian, Suzhou (CN); Lingfeng Tao, Suzhou (CN); Maosheng Li, Suzhou (CN); Weifeng Yang, Suzhou (CN); Peng Hong, Suzhou (CN); Jian Zhang, Suzhou (CN)

(73) Assignees: Jiangsu Jinling Institute of Intelligent Manufacturing Co., Ltd., Jiangsu (CN); United Material Handling Inc, Moreno Valley, CA (US)

( * ) Notice: Subject to any disclaimer, the term of this patent is extended or adjusted under 35 U.S.C. 154(b) by 388 days.

(21) Appl. No.: 16/652,479

(22) PCT Filed: Nov. 30, 2018

(86) PCT No.: PCT/CN2018/118590
§ 371 (c)(1),
(2) Date: Mar. 31, 2020

(87) PCT Pub. No.: WO2019/105464
PCT Pub. Date: Jun. 6, 2019

(65) Prior Publication Data
US 2020/0282498 A1 Sep. 10, 2020

(30) Foreign Application Priority Data
Nov. 30, 2017 (CN) .......................... 201711244705.8

(51) Int. Cl.
*B23P 19/00* (2006.01)
*B23P 21/00* (2006.01)
(Continued)

(52) U.S. Cl.
CPC .......... *B23P 19/001* (2013.01); *B23P 21/004* (2013.01); *B65G 27/00* (2013.01); *A47B 47/021* (2013.01); *B25J 9/0093* (2013.01); *B25J 11/005* (2013.01)

(58) Field of Classification Search
CPC .... B23P 21/004; B23P 19/001; A47B 47/021; A47B 47/027; A47B 47/028; B65G 1/02;
(Continued)

(56) References Cited

U.S. PATENT DOCUMENTS

| | | | | |
|---|---|---|---|---|
| 4,789,010 A | * | 12/1988 | Reymann | B21F 27/20 425/123 |
| 5,267,683 A | * | 12/1993 | Hamada | B23K 37/047 29/430 |
| 2019/0160611 A1 | * | 5/2019 | Viscardi | B23P 21/004 |

FOREIGN PATENT DOCUMENTS

| CN | 103203630 A | 7/2013 |
|---|---|---|
| CN | 103236219 A | 8/2013 |

(Continued)

OTHER PUBLICATIONS

Application No. PCT/CN2018/118590 International Search Report dated Mar. 12, 2019.
(Continued)

*Primary Examiner* — Matthew P Travers
(74) *Attorney, Agent, or Firm* — Keller Preece PLLC

(57) ABSTRACT

Disclosed are a full-automatic storage shelf assembly production line and an operation method thereof. The production line includes a logistics channel, a stand column-based feeding area, a supporting beam-based feeding area, an
(Continued)

in-line logistics system, a shelf assembly area, a finished product area, and a control system. The stand column-based feeding area, the supporting beam-based feeding area, the shelf assembly area, and the finished product area are connected in series by means of the in-line logistics system to form an integrated production line.

20 Claims, 2 Drawing Sheets

(51) Int. Cl.
    *B65G 27/00*     (2006.01)
    *B25J 9/00*     (2006.01)
    *B25J 11/00*     (2006.01)
    *A47B 47/02*     (2006.01)

(58) Field of Classification Search
    CPC ............... B65G 27/00; Y10T 29/49829; Y10T 29/53365; Y10T 29/534; Y10T 29/53417; Y10T 29/53435; Y10T 29/49616; Y10T 29/49623; Y10T 29/49625–49627
    See application file for complete search history.

(56) References Cited

FOREIGN PATENT DOCUMENTS

| | | | |
|---|---|---|---|
| CN | 104476202 | A | 4/2015 |
| CN | 105290785 | A | 2/2016 |
| CN | 105947634 | A | 9/2016 |
| CN | 205817268 | U | 12/2016 |
| CN | 106881590 | A | 6/2017 |
| CN | 107081759 | A | 8/2017 |
| CN | 107324043 | A | 11/2017 |
| CN | 107378476 | A | 11/2017 |
| CN | 108000091 | A | 5/2018 |
| JP | H04183537 | A | 6/1992 |
| JP | H04183539 | A | 6/1992 |
| JP | H0523931 | A | 2/1993 |

OTHER PUBLICATIONS

Application No. PCT/CN2018/118590 Written Opinion of the International Searching Authority dated Mar. 12, 2019.
Application No. 201711244705.8 First Office Action dated Sep. 28, 2018.

\* cited by examiner

FULL-AUTOMATIC STORAGE SHELF ASSEMBLY PRODUCTION LINE AND OPERATION METHOD THEREOF

CROSS-REFERENCE TO RELATED APPLICATIONS

The present application 371 of international application number PCT/CN2018/118590, filed Nov. 30, 2018, which claims priority to Chinese Patent Application No. 201711244705.8, filed with the Chinese Patent Office on Nov. 30, 2017, entitled "Full-automatic Storage Shelf Assembly Production Line and Operation Method Thereof." Each of the aforementioned applications are hereby incorporated by reference in their entirety.

TECHNICAL FIELD

The present disclosure relates to the technical field of products of assembly equipment, and in particular to a full-automatic storage shelf assembly production line and an operation method thereof (fully automatic assembly production line for storage shelves and a method of operating the same).

BACKGROUND ART

With the development of intelligent manufacturing technology, intelligent storage equipment is receiving high attention from the industry as a core constituent part of intelligent manufacturing and an important cornerstone for building a future "intelligent factory", and the assembly of storage shelves has become an urgent problem to be solved.

At present, the storage shelves are in the form of being manually assembled on a storage site. Various components of the shelves are transported by the supplier to the storage site and assembled by the installation personnel on the site, all the tasks from the carrying to the assembly and unloading of the various components of the shelves require manual intervention, and the labor cost is too high. Moreover, the shelf products have many specifications, are too large in product size, and are carried by a complicated process, which causes the waste of space and easily causes harm to the installation personnel. The assembly involves the alignment of positions of holes among multiple components as well as the matching relationship of each component in two positions. The installation personnel adjust manual operation frequently, the assembly efficiency is low, and furthermore the assembly site has no informationized means such that effective management and control of manpower, machines, goods, materials and so on cannot be achieved, which is not conducive to the effective management of workshops and factories. Therefore, in view of the current situation that the assembly of storage shelves involves a complicated process of transportation of components, has low assembly efficiency, and lacks informatization, a comprehensive solution with high degree of automation, strong adaptability, good flexibility degree and high production efficiency is provided.

SUMMARY

An object of the present disclosure includes providing a fully automatic assembly production line for storage shelves to solve the problem that the components of storage shelves are transported by a complicated process and assembled at low efficiency.

The present disclosure provides a fully automatic assembly production line for storage shelves, wherein the production line comprises a logistics passage, an upright column loading area, a support beam loading area, an intra-line logistics system, a shelf assembly area, a finished product area, and a control system, and the upright column loading area, the support beam loading area, the shelf assembly area, and the finished product area are connected in series as an integral production line by the intra-line logistics system, wherein:

the logistics passage acts as a passage for delivery of the required components and transferring of a shelf finished product in the shelf assembly production line;

the upright column loading area comprises an upright column loading gantry robot and a rail-type upright column loading vehicle, the rail-type upright column loading vehicle is configured for transportation of an upright column tray, and the rail-type upright column loading vehicle is integrated with a mechanical positioning system which restricts the rail-type upright column loading vehicle to a specified station; the upright column loading gantry robot is configured to grip and move an upright column to an upright column conveyor belt, and the upright column loading gantry robot is integrated with a visual measurement system which is responsible for measuring an error in machining of a mounting hole of the upright column;

the support beam loading area comprises a support beam loading robot, a bolt loading robot, and a bolt vibration loading tray, the support beam loading robot is configured to put a support beam on a positioning pin of a shelf assembly mold of the intra-line logistics system, the bolt loading robot is configured to put a bolt in a bolt hole of the shelf assembly mold of the intra-line logistics system, and the bolt vibration loading tray supplies, to the bolt loading robot, bolts arranged in a consistent rule;

the intra-line logistics system comprises a liftable conveyor belt in the support beam loading area, a liftable conveyor belt in the finished product area, a fixed conveyor belt in the shelf assembly area, an upright column conveyor belt, and a shelf assembly mold, and the shelf assembly mold is integrated with an upright column expanding mechanism; the upright column expanding mechanism is configured to expand a notch of the upright column by a certain distance while limiting the position of the upright column to ensure an alignment of the support beam with an assembly hole of the upright column; the shelf assembly mold provides a positioning datum for the placement of the support beam and the assembly of the upright column, and the shelf assembly mold is movable on the liftable conveyor belt in the support beam loading area, the liftable conveyor belt in the finished product area, and the fixed conveyor belt in the shelf assembly area; the fixed conveyor belt in the shelf assembly area contains two independent conveyor belt systems with different heights, and the liftable conveyor belt in the support beam loading area and the liftable conveyor belt in the finished product area are movable between the two independent conveyor belts;

the shelf assembly area comprises a nut assembling gantry robot, a nut vibration loading tray, an upright column jacking mechanism, and a support beam pressing mechanism; after the shelf assembly mold reaches the shelf assembly area, the nut assembling gantry robot grips and mounts a nut supplied by the nut vibration loading tray to the position of an assembly hole, the upright column jacking mechanism pushes the upright column from the upright column conveyor belt to a specified assembly position, and the support beam pressing mechanism is configured to constrain a movement of the support beam;

the finished product area comprises a finished product transferring gantry robot and a shelf temporary storage table, and the shelf gantry robot is configured to transfer the assembled shelf finished product to the shelf temporary storage table; and the control system is configured for the overall control of the assembly production line.

Optionally, the shelf assembly mold is provided thereon with positioning pins, the shelf assembly mold is mainly composed of a shelf assembly mold supporting plate and mold units, the mold units are disposed on the shelf assembly mold supporting plate, each of the mold units comprises a screw rod system, a bevel gear system, a rotary cylinder, a spur gear system, a bearing seat, a mold unit mounting plate, and two servo motors, the positioning pin is disposed on the rotary cylinder, and the positioning pin has four degrees of freedom, including three degrees of freedom of movement along a length direction, a width direction, and a thickness direction of the shelf assembly mold, and a degree of freedom of rotation along the thickness direction; the servo motor is configured to drive rotations of the bevel gear system and the spur gear system; the screw rod system, the bevel gear system, the rotary cylinder, the spur gear system, and the bearing seat are all disposed on the mold unit mounting plate, the rotary cylinder is disposed on the screw rod system via a sliding table, and the spur gear system is engaged with a rack on the shelf assembly mold supporting plate to achieve the movement of the mold unit in the length direction of the logistics passage; the screw rod system is configured for positioning of a cross bracing and a diagonal bracing and fixing of bolts in an assembly stage, the bevel gear system is driven to adjust a lateral spacing between a pair of positioning pins, and the spur gear system is configured to adjust a longitudinal spacing between the positioning pins of the two adjacent screw rod systems.

Optionally, each of end actuators of the upright column loading gantry robot, the support beam loading robot, the bolt loading robot, the nut assembling gantry robot, and the finished product transferring gantry robot has a visual recognition system configured to recognize the types of the support beam and the bolt, and to determine a position at which the end actuator grips.

Optionally, each of the upright column loading area and the shelf assembly area is provided with an upright column mechanical position-limiting system configured to limit the position of the upright column in the length direction of the logistics passage; and each of the shelf assembly area and the finished product area is provided with a shelf assembly mold mechanical position-limiting system configured to limit the position of the shelf assembly mold in the length direction of the logistics passage.

Optionally, there are a plurality of shelf assembly molds, and the plurality of shelf assembly molds are configured to perform the task of assembling shelves with multiple specifications with different takt time.

Optionally, the upright column loading area, the support beam loading area, the shelf assembly area, and the finished product area are connected in series by the intra-line logistics system to form a production line having a "linear" shape.

Optionally, the logistics passage has a "U" shape, and the upright column loading area, the support beam loading area, the intra-line logistics system, the shelf assembly area, and the finished product area are all disposed in a U-shaped groove of the logistics passage.

Optionally, the bolt loading robot is closer to the intra-line logistics system than the bolt vibration loading tray.

Optionally, the shelf temporary storage table is located on one side of the liftable conveyor belt in the finished product area.

Optionally, a screw rod of the screw rod system is perpendicular to a direction of feeding of the shelf assembly mold.

Optionally, there are two racks, the two racks are disposed in parallel and spaced apart along a length direction of a screw rod in the screw rod system, the spur gear system comprises two spur gears disposed to be spaced apart along the length direction of the screw rod, and the two spur gears are engaged with the two racks in one-to-one correspondence.

Optionally, the storage shelf comprises a support beam and an upright column, and the support beam includes a tubular cross bracing, a standard-form cross bracing, and a diagonal bracing; and the fully automatic assembly production line for storage shelves further comprises a tubular cross bracing material tray, a standard cross bracing material tray, and a diagonal bracing material tray, which are configured to carry the tubular cross bracings, the standard-form cross bracings, and the diagonal bracings, respectively.

Optionally, the tubular cross bracing material tray and the standard cross bracing material tray are disposed on the same side of the upright column conveyor belt, and the diagonal bracing material tray is disposed on the other side of the upright column conveyor belt.

Optionally, the tubular cross bracing material tray and the standard cross bracing material tray are sequentially disposed along a direction of feeding of the shelf assembly mold.

An object of the present disclosure further includes providing a method of operating a fully automatic assembly production line for storage shelves to solve the problem that the components of storage shelves are transported by a complicated process and assembled at low efficiency.

The present disclosure provides a method of operating a fully automatic assembly production line for storage shelves, comprising the steps of:

step 1: delivering upright columns, support beams, bolts, and nuts of a shelf to be assembled from a warehouse to respective loading trays by means of a forklift;

step 2: enabling the upright column loading gantry robot, the rail-type upright column loading vehicle, the shelf assembly mold, the bolt loading robot, the nut assembling gantry robot, and the finished product transferring gantry robot to synchronously acquire information on the specification of the shelf and automatically adjust to specified stations;

step 3: enabling the shelf assembly mold to enter the support beam loading area from an assembly station, using the control system to control the bolt loading robot to place bolts supplied by the bolt vibration loading tray into bolt slots of the shelf assembly mold, and totally completing the bolt loading task after the shelf assembly mold completely enters the support beam loading area, lifting the conveyor belt in the support beam loading area to a support beam loading station, and allowing the support beam loading robot to wait for loading information from the control system;

step 4: using, after the upright column loading gantry robot grips and moves an upright column onto the upright column conveyor belt of the intra-line logistics system, the visual measurement system to take a picture to identify the first hole and the last hole from an end face, calculate a cumulative error of the punched holes, and feed back the error to a servo motor to adjust a spacing between assembly holes of a support beam of the shelf assembly mold; and using the loading robot to place the support beams at specified locations of the shelf assembly mold, complete the loading of the support beams, and feed back a completion signal to the control system;

step 5: using the control system to control the shelf assembly mold and the upright column to enter the shelf assembly area after the above-mentioned completion signal is received, and then making the support beam pressing mechanism press down to fix each of the support beams, lowering a rotary cylinder of the shelf assembly mold, and using the upright column expanding mechanism to drive a cylinder piston rod to extend to an expansion station to wait for the assembling of the upright column;

step 6: using the upright column jacking mechanism to push the upright column to be aligned with the assembly hole of the support beam, and then retracting the cylinder piston rod of the upright column expanding mechanism and raising the support beam pressing mechanism, guiding the assembly hole by the rotary cylinder, and rotating the rotary cylinder and pushing the bolt to the assembly station and feeding back the signal to the control system after the guiding is completed;

step 7: sending a bolt assembling instruction by the control system based on the above-mentioned signal, and enabling, after the instruction is received, the nut assembling gantry robot to firstly obtain a nut at a predetermined position and then move to a position at which the shelf is to be assembled, correcting a positional error of a pneumatic fastening gun by an end visual measurement system, achieving a task of assembling multiple bolts on single side after the requirement is satisfied, and enabling the nut assembling gantry robot to return back to an initial position and feed back a completion signal to the control system after the task is completed;

step 8: using the control system to drive the intra-line logistics system to deliver the shelf assembly mold to the finished product area after the above-mentioned signal is received, acquiring, by a position sensor, a signal indicating that the shelf assembly mold is in position, and using the control system to control, based on this signal, the finished product transferring gantry robot to grip the shelf on the shelf assembly mold and place the same in a temporary storage area; and step 9: lowering the liftable conveyor belt in the finished product area and delivering the shelf assembly mold to the shelf assembly area to wait for an instruction of a next assembly procedure, after the above-mentioned process steps are completed.

Compared with the prior art, the present disclosure has the following advantageous effects: (1) Each robot system of the present disclosure is integrated with a visual recognition system, which can accurately identify information on materials, and avoids the situations of incorrect gripping and missed gripping, and each transportation system is integrated with a positioning system, which can achieve a high-precision positioning operation; (2) in the fully automatic assembly production line for storage shelves of the present disclosure, the number of operators is reduced, the labor intensity is reduced, and the number of personnel is reduced by 80% or more; the assembly production efficiency is improved, the production cycle is shortened by 50% or more, and the production capacity is increased by 200%; (3) the present disclosure has high degree of flexibility, and is adaptable to the assembly of shelf products with multiple different specifications, and the number and distribution mode of stations in each part may be set based on the takt time and the size of the site to achieve balanced production.

REFERENCE NUMERALS

1—forklift; 2—upright column loading gantry robot; 3—rail-type upright column loading vehicle; 4—shelf assembly mold; 5—tubular cross bracing material tray; 6—loading robot; 7—standard cross bracing material tray; 8—liftable conveyor belt in support beam loading area; 9—nut vibration loading tray; 10—nut assembling gantry robot; 11—finished product transferring gantry robot; 12—shelf temporary storage table; 13—liftable conveyor belt in finished product area; 14—fixed conveyor belt in shelf assembly area; 15—upright column jacking mechanism; 16—support beam pressing mechanism; 17—bolt loading robot; 18—bolt vibration loading tray; 19—diagonal bracing material tray; 20—upright column conveyor belt; 21—upright column expanding mechanism; 22—logistics passage; 23—upright column loading area; 24—support beam loading area; 25—intra-line logistics system; 26—shelf assembly area; 27—finished product area; 28—shelf assembly mold supporting plate; 29—mold unit; 30—screw rod system; 31—bevel gear system; 32—rotary cylinder; 33—spur gear system; 34—bearing seat; 35—mold unit mounting plate; 36—servo motor; 37—tubular cross bracing; 38—upright column; 39—standard-form cross bracing; 40—diagonal bracing.

DETAILED DESCRIPTION OF EMBODIMENTS

In view of the deficiencies or improvement requirements of the prior art, the present disclosure proposes a fully automatic assembly production line for storage shelves and a method of operating the same, wherein the layout of key parts of the assembly production line and the specific assembly manner thereof are researched and designed in connection with the characteristics of the assembly production line itself, so that the present disclosure can effectively solve the problems of complicated component transportation process and low assembly efficiency, and also has the advantages of good assembly flexibility and strong adaptability, therefore the present disclosure is especially suitable for the fully automatic assembly of a storage shelf from a batch of hollow slotted structural support members separated from one another.

Figure 1:
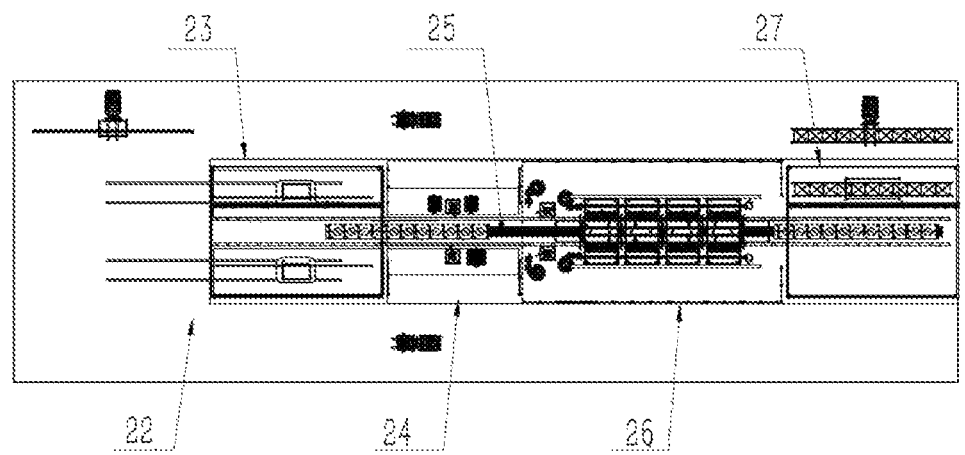
FIG. 1 is a plan layout diagram of a fully automatic assembly production line for storage shelves.
Figure 2:
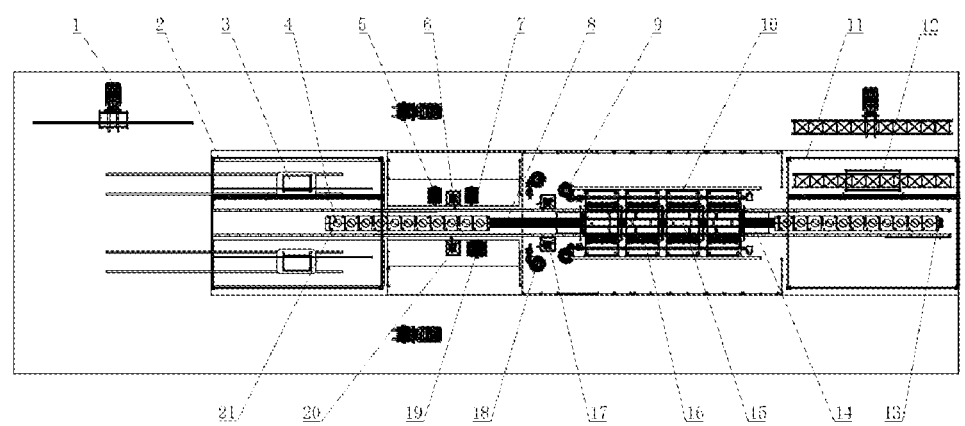
FIG. 2 is a structural schematic diagram of a fully automatic assembly production line for storage shelves.

With reference to FIG. 1 and FIG. 2, the present embodiment provides a fully automatic assembly production line for storage shelves, the production line comprises a logistics passage 22, an upright column loading area 23, a support beam loading area 24, an intra-line logistics system 25, a shelf assembly area 26, and a finished product area 27, and the upright column loading area 23, the support beam loading area 24, the shelf assembly area 26, and the finished product area 27 are connected in series as an integral production line by the intra-line logistics system 25, wherein:

The logistics passage 22 is a passage for delivery of the required components and transferring of a shelf finished product in the shelf assembly production line, and has a range which can satisfy the operation of the forklift 1.

The upright column loading area 23 comprises an upright column loading gantry robot 2 and a rail-type upright column loading vehicle 3. Here, the rail-type upright column loading vehicle 3 is responsible for transportation of an upright column tray, the rail-type upright column loading vehicle 3 is integrated with a mechanical positioning system which restricts the rail-type upright column loading vehicle 3 to a specified station, the upright column loading gantry robot 2 is responsible for gripping an upright column 38 to an upright column conveyor belt 20, and the upright column loading gantry robot 2 is integrated with a visual measurement system which is responsible for measuring an error in machining of a mounting hole of the upright column 38.

The support beam loading area 24 comprises a support beam loading robot 6, a bolt loading robot 17, and a bolt vibration loading tray 18. The support beam loading robot 6 is configured to put a support beam on a positioning pin of a shelf assembly mold 4 of the intra-line logistics system 25, the bolt loading robot 17 is configured to put a bolt in a bolt hole of the shelf assembly mold 4 of the intra-line logistics system 25, and the bolt vibration loading tray 18 supplies, to the bolt loading robot 17, bolts arranged in a consistent rule.

The intra-line logistics system 25 comprises a liftable conveyor belt 8 in the support beam loading area, a liftable conveyor belt 13 in the finished product area, a fixed conveyor belt 14 in the shelf assembly area, an upright column conveyor belt 20, and a shelf assembly mold 4, and the shelf assembly mold 4 is integrated with an upright column expanding mechanism 21. The upright column expanding mechanism 21 is configured to expand a notch of the upright column 38 by a certain distance while limiting the position of the upright column 38 to ensure an alignment of the support beam with an assembly hole of the upright column 38. The shelf assembly mold 4 provides a positioning datum for the placement of the support beam and the assembly of the upright column 38, and the shelf assembly mold 4 is movable on the liftable conveyor belt 8 in the support beam loading area, the liftable conveyor belt 13 in the finished product area, and the fixed conveyor belt 14 in the shelf assembly area. The fixed conveyor belt 14 in the shelf assembly area contains two independent conveyor belts with different heights, and the liftable conveyor belt 8 in the support beam loading area and the liftable conveyor belt 13 in the finished product area are movable between the two fixed conveyor belts.

The shelf assembly area 26 comprises a nut assembling gantry robot 10, a nut vibration loading tray 9, an upright column jacking mechanism 15, and a support beam pressing mechanism 16. After the shelf assembly mold 4 reaches the shelf assembly area 26, the nut assembling gantry robot 10 grips and mounts a nut supplied by the nut vibration loading tray 9 to the position of an assembly hole, the upright column jacking mechanism 15 pushes the upright column 38 from the upright column conveyor belt 20 to a specified assembly position, and the support beam pressing mechanism 16 is configured to constrain a movement of the support beam. Assuming that a length direction of the logistics passage 22 is an X direction, a direction perpendicular to the length direction of the logistics passage 22 in a horizontal plane is a Y direction, and an upward-downward direction is a Z direction, the support beam pressing mechanism 16 is configured to prevent the support beam from being shifted in the Y direction and the Z direction.

The finished product area 27 comprises a finished product transferring gantry robot 11 and a shelf temporary storage table 12, and the shelf gantry robot 11 is configured to transfer the assembled shelf finished product to the shelf temporary storage table 12.

A control system is configured for the overall control of the assembly production line.

Figure 3:
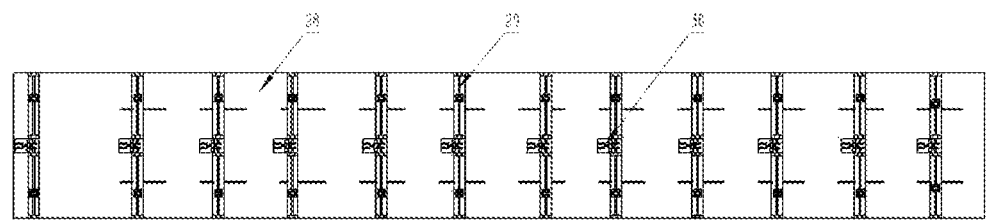
FIG. 3 is a composition diagram of a shelf assembly mold.
Figure 4:
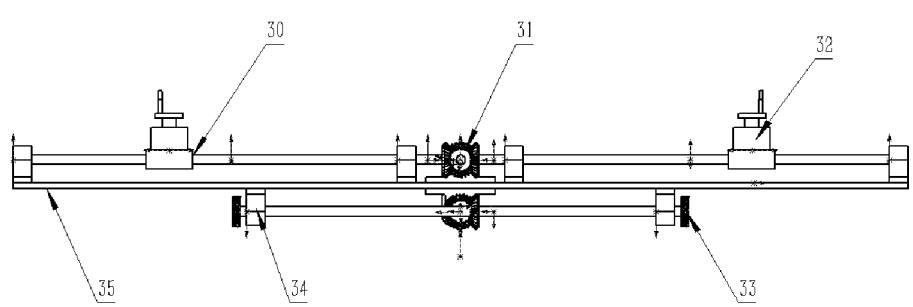
FIG. 4 is a composition diagram of a mold unit.

Optionally, the shelf assembly mold 4 has positioning pins thereon. As shown in FIG. 3, the shelf assembly mold 4 is mainly composed of a shelf assembly mold supporting plate 28 and mold units 29, and the mold units 29 are disposed on the shelf mold mounting plate 28. As shown in FIG. 4, each of the mold units 29 comprises a screw rod system 30, a bevel gear system 31, a rotary cylinder 32, a spur gear system 33, a bearing seat 34, a mold unit mounting plate 35, and two servo motors 36, which can meet the assembly and delivery of shelves with multiple specifications. The positioning pin is disposed on the rotary cylinder 32, and the positioning pin has four degrees of freedom, including three degrees of freedom of movement along a length direction, a width direction, and a thickness direction of the shelf assembly mold 4, and a degree of freedom of rotation along the thickness direction. The servo motor is configured to drive rotations of the bevel gear system 31 and the spur gear system 33. The screw rod system 30, the bevel gear system 31, the rotary cylinder 32, the spur gear system 33, and the bearing seat 34 are all disposed on the mold unit mounting plate 35, the rotary cylinder 32 is disposed on the screw rod system 30 via a sliding table, and the spur gear system 33 is engaged with a rack on the shelf assembly mold supporting plate 28 to achieve the movement of the mold unit 29 in the length direction of the logistics passage. The screw rod system 30 is configured for positioning of a cross bracing and a diagonal bracing and fixing of bolts in the assembly stage, and the bevel gear system 31 is driven to adjust a lateral spacing between a pair of positioning pins to meet the requirement of compatibility of the width of the mold; the spur gear system 33 is configured to adjust a longitudinal spacing between the positioning pins to meet the requirement of compatibility of the length of the shelf assembly mold, and the spacing between the positioning pins on the adjacent screw rod systems 30 can be finely adjusted by the spur gear system 33 during assembly to weaken the influence of an error in machining of the assembly holes of the upright column, and the assembly unit with four degrees of freedom freely combines and assembles the molds based on the shelf specification.

The shelf assembly production line is equipped with multiple shelf assembly molds 4, which can meet the tasks of assembling and producing shelves with multiple specifications with different takt time.

Optionally, each of end actuators of the upright column loading gantry robot 2, the support beam loading robot 6, the bolt loading robot 17, the nut assembling gantry robot 10, and the finished product transferring gantry robot 11 has a visual recognition system configured to recognize the types of the support beam and the bolt, and to determine a position at which the end actuator grips.

Optionally, the upright column loading area 23 and the shelf assembly area 26 each have an upright column mechanical position-limiting system, the shelf assembly area 26 and the finished product area 27 each have a shelf assembly mold mechanical position-limiting system, and the above-mentioned mechanical position-limiting system can ensure position-limiting of the upright column 38 and the shelf assembly mold 4 in the length direction of the logistics passage 22.

With continued reference to FIG. 1 and FIG. 2, in the present embodiment, the upright column loading area 23, the support beam loading area 24, the shelf assembly area 26, and the finished product area 27 are connected in series by the intra-line logistics system 25 to form a "linear" shape. Such an arrangement not only ensures smooth forward feeding of the shelf assembly mold 4 and reduces the unsmooth assembly process caused by a jam during a turning process, but also reduces the waste of time caused by the turning process, and further improves the assembly efficiency of the fully automatic assembly production line for storage shelves in the present embodiment.

With continued reference to FIG. 1 and FIG. 2, in the present embodiment, the logistics passage 22 is of a "U" shape, and specifically, the upright column loading area 23, the support beam loading area 24, the intra-line logistics system 25, the shelf assembly area 26, and the finished product area 27 are all disposed in a U-shaped groove of the logistics passage 22. This arrangement form, in which the logistics passage 22 is disposed around the above-mentioned individual stations in a half-surrounded manner, enables the forklift 1 to smoothly move to the individual stations during the movement in the logistics passage 22, thereby reducing the interference effect during the loading and unloading processes and ensuring the smooth progress of the loading and unloading processes.

It should be noted that, in the present embodiment, the "length direction of the logistics passage 22" means a length direction of two sides which are disposed oppositely in the U shape.

With continued reference to FIG. 2, in the present embodiment, the bolt loading robot 17 is closer to the intra-line logistics system 25 than the bolt vibration loading tray 18. Such an arrangement effectively shortens the gripping path of the bolt loading robot 17, and saves the time required for the process of gripping of the bolt, thereby further improving the assembly efficiency of the fully automatic assembly production line for storage shelves in the present embodiment.

With continued reference to FIG. 3, in the present embodiment, a screw rod of the screw rod system 30 is perpendicular to the direction of feeding of the shelf assembly mold 4. Moreover, there are two racks, the two racks are disposed in parallel and spaced apart along a length direction of the screw rod in the screw rod system 30, the spur gear system 33 comprises two spur gears disposed to be spaced apart along the length direction of the screw rod, and the two spur gears are engaged with the two racks in one-to-one correspondence.

Such an arrangement ensures the balance of forces exerted on both sides of the shelf assembly mold 4 during the adjustment of the spur gear system 33, and also reduces the damage of the mold unit 29 caused by local stress concentration, and prolongs the service life of the mold unit 29.

Figure 5:
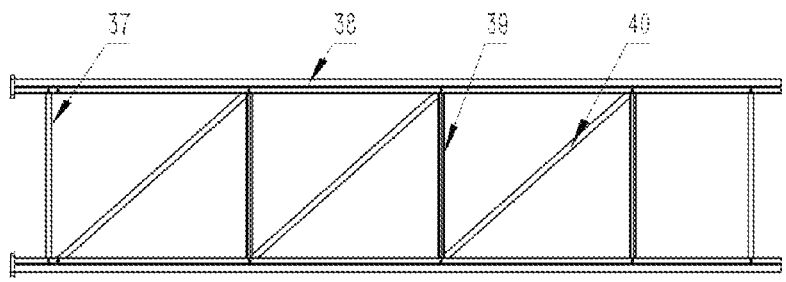
FIG. 5 is a composition diagram of a storage shelf.

Optionally, as shown in FIG. 5, the storage shelf comprises a support beam and an upright column 38, and the support beam includes a tubular cross bracing 37, a standard-form cross bracing 39, and a diagonal bracing 40. The fully automatic assembly production line for storage shelves further comprises a tubular cross bracing material tray 5, a standard cross bracing material tray 7, and a diagonal bracing material tray 19, which are configured to carry the tubular cross bracings 37, the standard-form cross bracings 39, and the diagonal bracings 40, respectively.

A method of operating a fully automatic assembly production line for storage shelves comprises the following steps:

(1) Upright columns, support beams, bolts, and nuts of a shelf to be assembled are delivered from a warehouse to respective loading trays by means of a forklift 1, the components in each loading tray are placed neatly by an automatic palletizer in accordance with assembly requirements before being discharged from the warehouse, and the number of each of the components can meet the single-shift production requirement of this production line.

(2) The upright column loading gantry robot 2, the rail-type upright column loading vehicle 3, the shelf assembly mold 4, the bolt loading robot 17, the nut assembling gantry robot 10, and the finished product transferring gantry robot 11 synchronously acquire information on the specification of the shelf and automatically adjust to specified stations.

(3) The shelf assembly mold 4 enters the support beam loading area 24 from an assembly station, and the control system controls the bolt loading robot 17 to place bolts supplied by the bolt vibration loading tray 18 into bolt slots of the shelf assembly mold 4, and after the shelf assembly mold 4 completely enters the support beam loading area 24, the bolt loading task is totally completed, the liftable conveyor belt 8 in the support beam loading area is lifted to a support beam loading station, and the support beam loading robot 6 waits for loading information from the control system.

(4) After the upright column loading gantry robot 2 grips and moves an upright column 38 onto the upright column conveyor belt 20 of the intra-line logistics system 25, the visual measurement system takes a picture to identify the first hole and the last hole from an end face, calculates a cumulative error of the punched holes, and feeds back the error to a servo motor 36 to adjust a spacing between assembly holes of a support beam of the shelf assembly mold 4. The loading robot 6 places the support beams at specified locations of the shelf assembly mold 4, completes the loading of the support beams, and feeds back a completion signal to the control system.

(5) After receiving the above-mentioned completion signal, the control system controls the shelf assembly mold 4 and the upright column 38 to enter the shelf assembly area 26, the uniformity of datum for assembling of the shelf assembly mold 4 and the upright column 38 are ensured by a position-limiting adjustment system, and then the support beam pressing mechanism 16 is pressed down to fix each of the support beams, a rotary cylinder 32 of the shelf assembly mold 4 is lowered, and the upright column expanding mechanism 21 drives a cylinder piston rod to extend to an expansion station to wait for the assembling of the upright column 38.

(6) The upright column jacking mechanism 15 pushes the upright column 38 to be aligned with the assembly hole of the support beam, and mechanical position-limiting performed by the upright column expanding mechanism 21 ensures arrival of the upright column 38 at a specified assembly station to avoid excessive pushing of the upright column 38; and then the cylinder piston rod of the upright column expanding mechanism 21 is retracted and the support beam pressing mechanism 16 is raised, the rotary cylinder 32 guides the assembly hole, and after the guiding is completed, the cylinder rotates and pushes the bolt to the assembly station, and the signal is fed back to the control system.

(7) The control system sends a bolt assembling instruction based on the above-mentioned signal, and after receiving the instruction, the nut assembling gantry robot 10 firstly obtains a nut at a predetermined position and then moves to a position at which the shelf is to be assembled, a positional error of a pneumatic fastening gun is corrected by an end visual measurement system, a task of assembling multiple bolts on single side is carried out after the requirement is satisfied, and the nut assembling gantry robot 10 returns back to an initial position and feeds back a completion signal to the control system after the task is completed.

(8) After receiving the above-mentioned signal, the control system will drive the shelf assembly mold 4 of the intra-line logistics system 25 to be delivered to the finished product area 27, a position sensor will acquire a signal indicating that the shelf assembly mold 4 is in position, and the control system controls, based on this signal, the finished product transferring gantry robot 11 to grip the shelf on the shelf assembly mold 4 and place the same in a temporary storage area.

(9) After the above-mentioned process steps are completed, the liftable conveyor belt 13 in the finished product area is lowered and the shelf assembly mold 4 is delivered to the shelf assembly area 26 to wait for an instruction of a next assembly procedure.

It will be readily understood by those skilled in the art that the above description is merely illustrative of preferred embodiments of the present disclosure and is not intended to limit the present disclosure, and any modifications, equivalent alternatives, improvements and so on made within the spirit and principle of the present disclosure are to be included in the scope of protection of the present disclosure.

INDUSTRIAL APPLICABILITY

The present disclosure provides a fully automatic assembly production line for storage shelves and a method of operating the same, which reduce the labor intensity during the assembly of a storage shelf, improve the assembly production efficiency, and have high degree of flexibility, and is adaptable to the assembly of shelf products with multiple different specifications, and moreover the number and distribution mode of stations in each part may be set based on the takt time and the size of the site to achieve balanced production.

The invention claimed is:

1. A fully automatic assembly production line for storage shelves, wherein the fully automatic assembly production line comprises a logistics passage, an upright column loading area, a support beam loading area, an intra-line logistics system, a shelf assembly area, a finished product area, and a controller, and the upright column loading area, the support beam loading area, the shelf assembly area, and the finished product area are connected in series as an integral production line by the intra-line logistics system, wherein:

the logistics passage acts as a passage for delivery of required components and transferring of a shelf finished product in a shelf assembly production line;

the upright column loading area comprises an upright column loading gantry robot and a rail-type upright column loading vehicle, the rail-type upright column loading vehicle is configured for transportation of an upright column tray, and the rail-type upright column loading vehicle is integrated with a mechanical positioner which restricts the rail-type upright column loading vehicle to a specified station; the upright column loading gantry robot is configured to grip and move an upright column to an upright column conveyor belt, and the upright column loading gantry robot is configured to measure an error in machining of a mounting hole of the upright column;

the support beam loading area comprises a support beam loading robot, a bolt loading robot, and a bolt vibration loading tray, the support beam loading robot is configured to put a support beam on a positioning pin of a shelf assembly mold of the intra-line logistics system, the bolt loading robot is configured to put a bolt in a bolt hole of the shelf assembly mold of the intra-line logistics system, and the bolt vibration loading tray supplies, to the bolt loading robot, bolts arranged in a consistent rule;

the intra-line logistics system comprises a liftable conveyor belt in the support beam loading area, a liftable conveyor belt in the finished product area, a fixed conveyor belt in the shelf assembly area, an upright column conveyor belt, and the shelf assembly mold, and the shelf assembly mold is integrated with an upright column expander; the upright column expander is configured to expand a notch of the upright column by a certain distance while limiting a position of the upright column to ensure an alignment of the support beam with an assembly hole of the upright column; the shelf assembly mold provides a positioning datum for a placement of the support beam and an assembly of the upright column, and the shelf assembly mold is movable on the liftable conveyor belt in the support beam loading area, the liftable conveyor belt in the finished product area, and the fixed conveyor belt in the shelf assembly area; the fixed conveyor belt in the shelf assembly area contains two independent conveyor belt systems with different heights, and the liftable conveyor belt in the support beam loading area and the liftable conveyor belt in the finished product area are movable between the two independent conveyor belts;

the shelf assembly area comprises a nut assembling gantry robot, a nut vibration loading tray, an upright column jack, and a support beam press; after the shelf assembly mold reaches the shelf assembly area, the nut assembling gantry robot grips and mounts a nut supplied by the nut vibration loading tray to a position of an assembly hole, the upright column jack pushes the upright column from the upright column conveyor belt to a specified assembly position, and the support beam press is configured to constrain a movement of the support beam;

the finished product area comprises a finished product transferring gantry robot and a shelf temporary storage table, and a shelf gantry robot is configured to transfer the assembled shelf finished product to the shelf temporary storage table; and the controller is configured for an overall control of the fully automatic assembly production line.

2. The fully automatic assembly production line for storage shelves according to claim 1, wherein the shelf assembly mold is provided thereon with positioning pins, the shelf assembly mold comprises a shelf assembly mold supporting plate and mold units, the mold units are disposed on the shelf assembly mold supporting plate, each of the mold units comprises a screw rod system, a bevel gear system, a rotary cylinder, a spur gear system, a bearing seat, a mold unit mounting plate, and two servo motors, the positioning pins are disposed on the rotary cylinder, and the positioning pins have four degrees of freedom, including three degrees of freedom of movement along a length direction, a width direction, and a thickness direction of the shelf assembly mold, and a degree of freedom of rotation along the thickness direction; the servo motors are configured to drive rotations of the bevel gear system and the spur gear system; the screw rod system, the bevel gear system, the rotary cylinder, the spur gear system, and the bearing seat are all disposed on the mold unit mounting plate, the rotary cylinder is disposed on the screw rod system via a sliding table, and the spur gear system is engaged with a rack on the shelf assembly mold supporting plate to achieve the movement of a mold unit of the mold units in a length direction of the logistics passage; the screw rod system is configured for positioning of a cross bracing and a diagonal bracing and fixing of bolts in an assembly stage, the bevel gear system is driven to adjust a lateral spacing between a pair of positioning pins, and the spur gear system is configured to adjust a longitudinal spacing between the positioning pins of two adjacent screw rod systems.

3. The fully automatic assembly production line for storage shelves according to claim 2, wherein end actuators of the upright column loading gantry robot, the support beam loading robot, the bolt loading robot, the nut assembling gantry robot, and the finished product transferring gantry robot are each configured to recognize types of support beams and bolts, and to determine a position at which the end actuator grips.

4. The fully automatic assembly production line for storage shelves according to claim 3, wherein each of the upright column loading area and the shelf assembly area is provided with an upright column mechanical position limiter configured to limit a position of the upright column in the length direction of the logistics passage; and each of the shelf assembly area and the finished product area is provided with a shelf assembly mold mechanical position limiter configured to limit a position of the shelf assembly mold in the length direction of the logistics passage.

5. The fully automatic assembly production line for storage shelves according to claim 2, wherein a screw rod of the screw rod system is perpendicular to a direction of feeding of the shelf assembly mold.

6. The fully automatic assembly production line for storage shelves according to claim 2, wherein two racks are provided, the two racks are disposed in parallel and spaced apart along a length direction of a screw rod in the screw rod system, the spur gear system comprises two spur gears disposed to be spaced apart along the length direction of the screw rod, and the two spur gears are engaged with the two racks in one-to-one correspondence.

7. The fully automatic assembly production line for storage shelves according to claim 1, further comprising a plurality of shelf assembly molds, and the plurality of shelf assembly molds are configured to perform the tasks of assembling shelves with multiple specifications with different takt time.

8. The fully automatic assembly production line for storage shelves according to claim 1, wherein the upright column loading area, the support beam loading area, the shelf assembly area, and the finished product area are connected in series by the intra-line logistics system to form a production line having a linear shape.

9. The fully automatic assembly production line for storage shelves according to claim 1, wherein the logistics passage is of a "U" shape, and the upright column loading area, the support beam loading area, the intra-line logistics system, the shelf assembly area, and the finished product area are all disposed in a U-shaped groove of the logistics passage.

10. The fully automatic assembly production line for storage shelves according to claim 1, wherein the bolt loading robot is closer to the intra-line logistics system than the bolt vibration loading tray.

11. The fully automatic assembly production line for storage shelves according to claim 1, wherein the shelf temporary storage table is located on one side of the liftable conveyor belt in the finished product area.

12. The fully automatic assembly production line for storage shelves according to claim 1, wherein each storage shelf comprises at least one support beam and an upright column, and the at least one support beam comprises a tubular cross bracing, and a diagonal bracing; and the fully automatic assembly production line for storage shelves further comprises a tubular cross bracing material tray and a diagonal bracing material tray, which are configured to carry the tubular cross bracing and the diagonal bracing, respectively.

13. The fully automatic assembly production line for storage shelves according to claim 12, wherein the tubular cross bracing material tray and the cross bracing material tray are disposed on a first side of the upright column conveyor belt, and the diagonal bracing material tray is disposed on a second side of the upright column conveyor belt.

14. The fully automatic assembly production line for storage shelves according to claim 13, wherein the tubular cross bracing material tray and the cross bracing material tray are sequentially disposed along a direction of feeding of the shelf assembly mold.

15. A method of operating the fully automatic assembly production line for storage shelves according to claim 1, comprising steps of:
  step 1: delivering upright columns, support beams, bolts, and nuts of a shelf to be assembled, from a warehouse to respective loading trays by means of a forklift;
  step 2: enabling the upright column loading gantry robot, the rail-type upright column loading vehicle, the shelf assembly mold, the bolt loading robot, the nut assembling gantry robot, and the finished product transferring gantry robot to synchronously acquire information on a specification of the shelf and automatically adjust to specified stations;
  step 3: enabling the shelf assembly mold to enter the support beam loading area from an assembly station, using the controller to control the bolt loading robot to place bolts supplied by the bolt vibration loading tray into bolt slots of the shelf assembly mold, and completing a bolt loading task after the shelf assembly mold completely enters the support beam loading area, lifting the conveyor belt in the support beam loading area to a support beam loading station, and allowing the support beam loading robot to wait for loading information from the controller;
  step 4: after upright column loading gantry robot grips and moves an upright column onto the upright column conveyor belt of the intra-line logistics system, taking a picture to identify a first hole and a last hole from an end face, calculating a cumulative error of punched holes, and feeding back the error to a servo motor to adjust a spacing between assembly holes of a support beam of the shelf assembly mold; and using the loading robot to place the support beams at specified locations of the shelf assembly mold, complete a loading of the support beams, and feed back a completion signal to the controller;

step 5: using the controller to control the shelf assembly mold and the upright column to enter the shelf assembly area after the completion signal is received, and then making the support beam press to press down to fix each of the support beams, lowering a rotary cylinder of the shelf assembly mold, and using the upright column expander to drive a cylinder piston rod to extend to an expansion station to wait for an assembling of the upright column;

step 6: using the upright column jack to push the upright column to be aligned with an assembly hole of a support beam, and then retracting the cylinder piston rod of the upright column expander and raising the support beam press, guiding the assembly hole by the rotary cylinder, and rotating the rotary cylinder and pushing a bolt to the assembly station and feeding back a second signal to the controller after a guiding is completed;

step 7: sending a bolt assembling instruction by the controller based on the second signal, and enabling, after the instruction is received, the nut assembling gantry robot to firstly obtain a nut at a predetermined position and then move to a position at which the shelf is to be assembled, correcting a positional error of a pneumatic fastening gun, carrying out a task of assembling multiple bolts on a single side, and enabling the nut assembling gantry robot to return back to an initial position and feed back a second completion signal to the controller after the task is completed;

step 8: using the controller to drive the intra-line logistics system to deliver the shelf assembly mold to the finished product area after the second completion signal is received, acquiring, by a position sensor, a third signal indicating that the shelf assembly mold is in position, and using the controller to control, based on the third signal, the finished product transferring gantry robot to grip the shelf on the shelf assembly mold and place the shelf in a temporary storage area; and step 9: lowering the liftable conveyor belt in the finished product area and delivering the shelf assembly mold to the shelf assembly area to wait for an instruction of a next assembly procedure, after the above-mentioned process steps are completed.

16. The method of operating the fully automatic assembly production line for storage shelves according to claim 15, wherein the shelf assembly mold is provided thereon with positioning pins, the shelf assembly mold comprises a shelf assembly mold supporting plate and mold units, the mold units are disposed on the shelf assembly mold supporting plate, each of the mold units comprises a screw rod system, a bevel gear system, a rotary cylinder, a spur gear system, a bearing seat, a mold unit mounting plate, and two servo motors, the positioning pins are disposed on the rotary cylinder, and the positioning pins have four degrees of freedom, including three degrees of freedom of movement along a length direction, a width direction, and a thickness direction of the shelf assembly mold, and a degree of freedom of rotation along the thickness direction; the servo motors are configured to drive rotations of the bevel gear system and the spur gear system; the screw rod system, the bevel gear system, the rotary cylinder, the spur gear system, and the bearing seat are all disposed on the mold unit mounting plate, the rotary cylinder is disposed on the screw rod system via a sliding table, and the spur gear system is engaged with a rack on the shelf assembly mold supporting plate to achieve the movement of the mold unit in a length direction of the logistics passage; the screw rod system is configured for positioning of a cross bracing and a diagonal bracing and fixing of bolts in an assembly stage, the bevel gear system is driven to adjust a lateral spacing between a pair of positioning pins, and the spur gear system is configured to adjust a longitudinal spacing between the positioning pins of two adjacent screw rod systems.

17. The method of operating the fully automatic assembly production line for storage shelves according to claim 16, wherein end actuators of the upright column loading gantry robot, the support beam loading robot, the bolt loading robot, the nut assembling gantry robot, and the finished product transferring gantry robot are each configured to recognize types of support beams and bolts, and to determine a position at which the end actuator grips.

18. The method of operating the fully automatic assembly production line for storage shelves according to claim 17, wherein each of the upright column loading area and the shelf assembly area is provided with an upright column mechanical position limiter configured to limit a position of the upright column in the length direction of the logistics passage; and each of the shelf assembly area and the finished product area is provided with a shelf assembly mold mechanical position limiter configured to limit a position of the shelf assembly mold in the length direction of the logistics passage.

19. The method of operating the fully automatic assembly production line for storage shelves according to claim 16, wherein two racks are provided, the two racks are disposed in parallel and spaced apart along a length direction of a screw rod in the screw rod system, the spur gear system comprises two spur gears disposed to be spaced apart along the length direction of the screw rod, and the two spur gears are engaged with the two racks in one-to-one correspondence.

20. The method of operating the fully automatic assembly production line for storage shelves according to claim 15, wherein each storage shelf comprises at least one support beam and an upright column, and the at least one support beam comprises a tubular cross bracing and a diagonal bracing; and the fully automatic assembly production line for storage shelves further comprises a tubular cross bracing material tray and a diagonal bracing material tray, which are configured to carry the tubular cross bracings and the diagonal bracings, respectively.

\* \* \* \* \*